United States Patent
Wang et al.

(10) Patent No.: US 8,721,902 B1
(45) Date of Patent: *May 13, 2014

(54) METHOD AND SYSTEM FOR PROVIDING AN ENERGY ASSISTED MAGNETIC RECORDING WRITER HAVING A HEAT SINK AND NFT

(75) Inventors: Zhongyan Wang, San Ramon, CA (US); Wei Gao, Fremont, CA (US); Shawn M. Tanner, San Jose, CA (US); Mirzafer Abatchev, Boise, ID (US); Yanfeng Chen, Milpitas, CA (US); Yufeng Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/046,380

(22) Filed: Mar. 11, 2011

(51) Int. Cl.
*B44C 1/22* (2006.01)

(52) U.S. Cl.
USPC .......... 216/22; 360/59; 360/125.31; 29/592.1; 369/13.33

(58) Field of Classification Search
USPC .......... 216/22; 29/592.1, 603.16; 360/125.31, 360/59, 69, 77.01; 369/13.01, 13.23, 13.33; 427/130, 552; 428/810, 831
See application file for complete search history.

(56) References Cited

U.S. PATENT DOCUMENTS

| | | | |
|---|---|---|---|
| 4,106,975 A * | 8/1978 | Berkenblit et al. | 216/47 |
| 4,667,395 A | 5/1987 | Ahlgren et al. | |
| 5,940,697 A * | 8/1999 | Yoo et al. | 438/182 |
| 5,994,747 A | 11/1999 | Wu | |
| 6,746,877 B1 | 6/2004 | Hornik et al. | |
| 6,795,630 B2 | 9/2004 | Challener et al. | |
| 7,272,079 B2 | 9/2007 | Challener | |
| 7,500,255 B2 | 3/2009 | Seigler et al. | |
| 7,791,839 B2 | 9/2010 | Olson et al. | |
| 7,965,464 B2 | 6/2011 | Batra et al. | |
| 8,024,748 B1 | 9/2011 | Moravec et al. | |
| 8,134,794 B1 | 3/2012 | Wang | |
| 8,164,855 B1 | 4/2012 | Gibbons et al. | |
| 8,248,891 B2 | 8/2012 | Lee et al. | |
| 8,286,329 B1 * | 10/2012 | Zhao et al. | 29/592.1 |
| 8,307,540 B1 | 11/2012 | Tran et al. | |
| 8,310,901 B1 | 11/2012 | Batra et al. | |
| 8,375,565 B2 | 2/2013 | Hu et al. | |

(Continued)

OTHER PUBLICATIONS

Zhongyan Wang, et al., "An approach for nanometer trench and hole formation", Optical Microlithography XXI, Proceedings of the SPIE, vol. 6924, pp. 692447-692447-8 (2008).

*Primary Examiner* — Duy Deo
*Assistant Examiner* — Erin Bergner

(57) ABSTRACT

A method provides an EAMR transducer. The EAMR transducer is coupled with a laser and has an ABS configured to reside in proximity to a media during use. The EAMR transducer includes an NFT for focusing the energy onto the media. A sacrificial layer is deposited on the NFT and a mask having an aperture provided on the sacrificial layer. A portion of the sacrificial layer exposed by the aperture is removed to form a trench above the NFT. A heat sink is then provided. At least part of the heat sink resides in the trench. The heat sink is thermally coupled to the NFT. Optical material(s) are provided around the heat sink. A write pole configured to write to a region of the media is also provided. The write pole is thermally coupled with the top of the heat sink. Coil(s) for energizing the write pole are also provided.

20 Claims, 14 Drawing Sheets

(56) References Cited

U.S. PATENT DOCUMENTS

| | | |
|---|---|---|
| 8,391,108 B2 | 3/2013 | Peng et al. |
| 8,416,530 B2 | 4/2013 | Gao et al. |
| 8,456,969 B1 | 6/2013 | Mooney et al. |
| 8,486,286 B1 | 7/2013 | Gao et al. |
| 2003/0137772 A1 | 7/2003 | Challener |
| 2008/0068748 A1 | 3/2008 | Olson et al. |
| 2010/0104768 A1 | 4/2010 | Xiao et al. |
| 2010/0123965 A1 | 5/2010 | Lee et al. |
| 2010/0123967 A1 | 5/2010 | Batra et al. |
| 2010/0214685 A1 | 8/2010 | Seigler et al. |
| 2011/0090588 A1 | 4/2011 | Gao et al. |

* cited by examiner

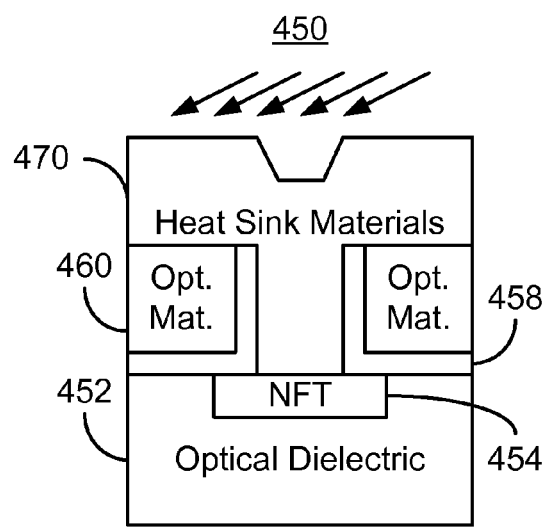
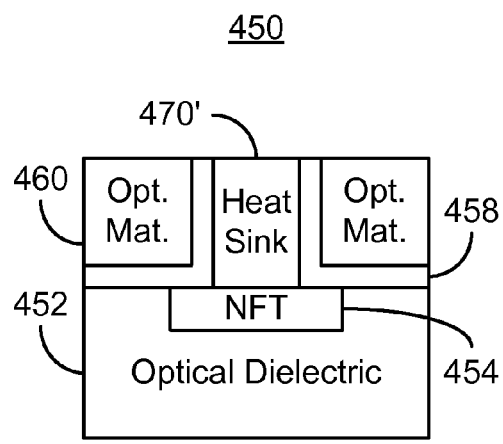
FIG. 34
FIG. 35

METHOD AND SYSTEM FOR PROVIDING AN ENERGY ASSISTED MAGNETIC RECORDING WRITER HAVING A HEAT SINK AND NFT

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. At current high recording densities, performance of the EAMR transducer 10 may degrade. In particular, the NFT 22 may absorb a significant amount of heat during operation. As a result, the conventional NFT 22 may degrade. In some instances, the conventional NFT 22 may be destroyed during use. Consequently, a mechanism for dissipating heat without adversely affecting performance of the EAMR head may be desired.

Accordingly, what is needed is a system and method for improving performance and reliability of an EAMR transducer.

BRIEF SUMMARY OF THE INVENTION

A method provides an EAMR transducer. The EAMR transducer is coupled with a laser and has an ABS configured to reside in proximity to a media during use. The EAMR transducer includes a near field transducer (NFT) proximate to the ABS for focusing the energy onto the region of the media. The method includes depositing a sacrificial layer on the NFT and providing a mask on the sacrificial layer. The mask has an aperture therein. A portion of the sacrificial layer exposed by the aperture is removed to form a trench therein. The trench is above the NFT. A heat sink is then provided. At least a portion of the heat sink resides in the trench. The heat sink has a top surface and a bottom thermally coupled to the NFT. Optical material(s) are provided around the heat sink. A write pole configured to write to a region of the media is also provided. The write pole has a bottom surface, a portion of which is thermally coupled with the top surface of the heat sink. Coil(s) for energizing the write pole are also provided.

BRIEF DESCRIPTION OF THE DRAWINGS

FIGS. 26-35 are diagrams depicting another exemplary embodiment of a magnetic recording transducer during fabrication.

DETAILED DESCRIPTION OF THE EMBODIMENTS OF THE INVENTION

Figure 1:
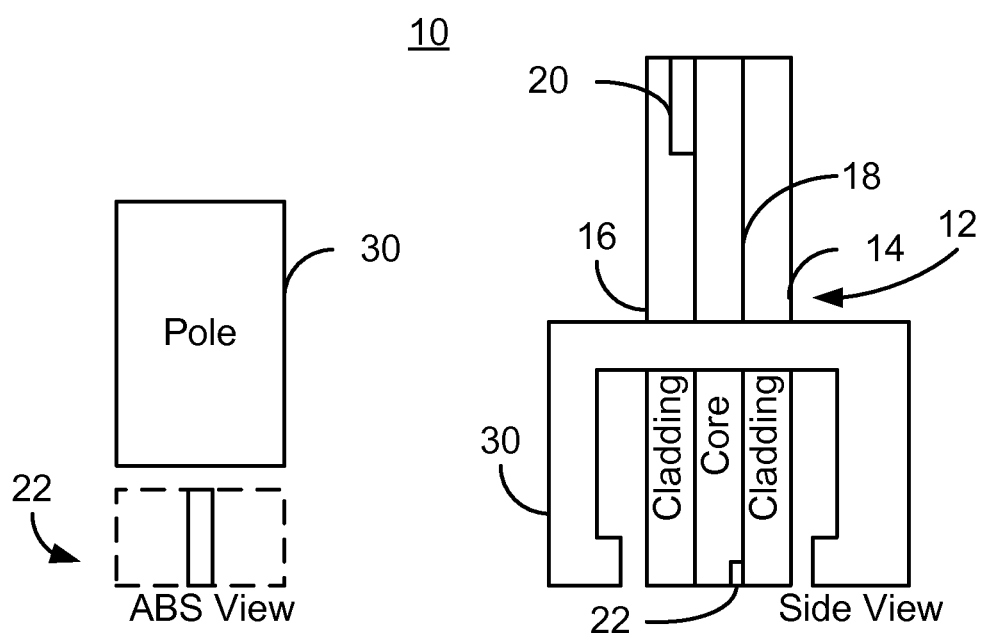
FIG. 1 is a diagram depicting a conventional EAMR transducer.
Figure 2:
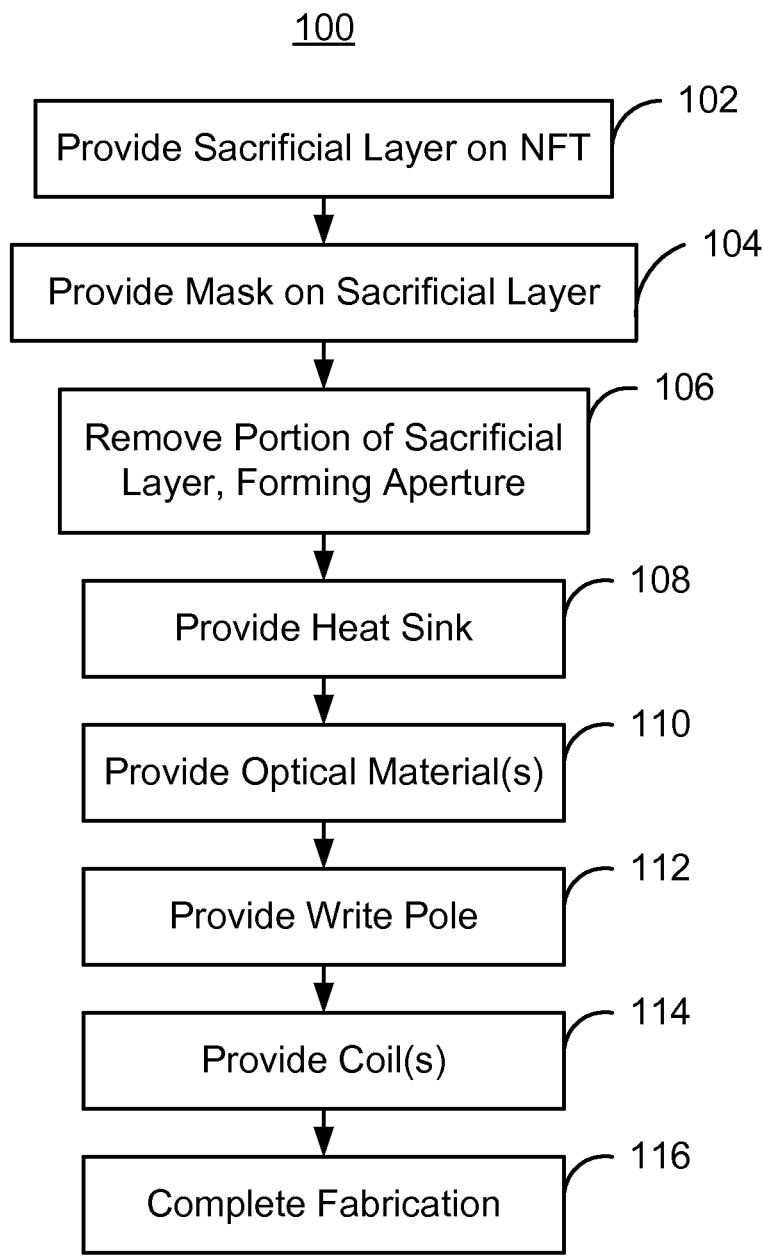
FIG. 2 is a flow chart depicting an exemplary embodiment of a method for fabricating an EAMR transducer including a heat sink.

FIG. 2 is a flow chart depicting an exemplary embodiment of a method 100 for fabricating an EAMR transducer having a heat sink. For simplicity, some steps may be omitted, interleaved, and/or combined. The EAMR transducer being fabricated may be part of a merged head that also includes a read head (not shown) and resides on a slider (not shown) in a disk drive. The method 100 is also described in the context of providing a single EAMR transducer. However, the method 100 may be used to fabricate multiple transducers at substantially the same time. The method 100 and system are also described in the context of particular layers. However, in some embodiments, such layers may include multiple sublayers. The method 100 also may commence after formation of other portions of the EAMR transducer. For example, the method 100 may commences after formation of portions of the EAMR transducer, such as a core. Step 100 may also commence after formation of the NFT. The NFT is used to focus the laser energy onto the region of the media to be written. The NFT has two portions—a disk and a pin. The pin has a width, as viewed from the ABS, that is significantly less than the disk. The pin is between the disk and the ABS. In some embodiments, the disk has a circular cross-section, or footprint. However, in other embodiments, the disk may have another shape. The NFT is conductive and, in some embodiments, includes Au. In some such embodiments, a protection layer may also be deposited on the NFT prior to step 102, described below. Such a protection layer would resistant to a process used in removing the portion of the sacrificial layer, described below in step 106. In some embodiments, a flat surface for formation of subsequent structures has been provided prior to step 102.

A sacrificial layer is deposited on the NFT, via step 102. The sacrificial layer may have different compositions depending upon the precise methodology selected. For example, in some embodiments, the sacrificial layer might include photoresist. In other embodiments, the sacrificial layer may include optical material(s), hard mask material(s), and/or nonmagnetic material(s) such as aluminum oxide, amorphous carbon (a-C), SiC and/or an organic material.

A mask is provided on the sacrificial layer, via step 104. The mask may also include an aperture. For example, the mask may be a hard mask having an aperture formed therein. Such a hard mask may include one or more metal layers, such as a bilayer of Cr and Ru or Ta. Step 104 may thus include providing a mask structure, such as a photoresist post, on the NFT. A mask layer that covers the mask structure and the surrounding region may be deposited. The mask structure may then be removed, for example via a high angle ion milling and lift-off process. The aperture may thus be formed in the mask. Alternatively, the mask may be a photoresist mask in which the aperture is printed into the mask. In such embodiments, the mask may also include an antireflective layer, such as a bottom antireflective (BARC) layer including AR3.

A portion of the sacrificial layer is removed to form a trench therein, via step 106. The trench is above the NFT. In some embodiments, the portion of the sacrificial layer exposed by the aperture is removed to form the trench. For example a reactive ion etch (RIE) appropriate for the materials used may be employed. However, the NFT is desired to remain undamaged during formation of the trench in step 106. In some embodiments, the trench may have substantially vertical sidewalls. In other embodiments, the trench may have a bottom and a top wider than the bottom. In still other embodiments, the trench may have a reentrant profile, with the bottom being wider than the top. In embodiments in which the sacrificial layer is a photoresist layer, step 106 is performed via photolithography and step 104 may be omitted.

A heat sink is provided, via step 108. Step 108 may be completed in a variety of manners. High thermal conductivity materials such as Au, Cu, and/or other high thermal conductivity materials may be used for the heat sink. Step 108 may include depositing high thermal conductivity material(s), and then removing any excess that is external to the trench. The excess heat sink material(s) may be removed by ion milling the heat sink material(s) at a milling angle that is greater than zero degrees from a normal to a top surface of the transducer. In other embodiments, the excess heat sink material(s) may be removed by a planarization such as a CMP. Thus, at least a portion of the heat sink is in the trench. In still other embodiments, a hard mask may be provided on the heat sink material(s) above the trench. In some such embodiments, the hard mask is provided by depositing hard mask layer(s) and providing a mask structure such as a photoresist post. The pattern of the mask structure is then transferred to the hard mask layer(s), forming a hard mask. The pattern of the hard mask is transferred to the heat sink material(s). In such an embodiment, a portion of the heat sink exists external to the trench. Thus, the heat sink may be formed. The heat sink provided in step 108 has a bottom surface thermally coupled to the NFT. In some embodiments, the bottom surface of the heat sink is in direct physical contact with the top of the NFT. In some embodiments, a portion of at least the heat sink is removed. Thus, the top surface of the heat sink is at an angle with respect to the ABS. This angle is greater than zero and less than ninety degrees. In some embodiments, the remaining sacrificial material is removed as part of or after step 108.

Optical material(s) are provided around the heat sink, via step 110. Step 110 may, for example, include depositing aluminum oxide, silicon oxide, or other analogous material. Thus, a portion of the cladding for the waveguide of the transducer may be provided. In some embodiments, step 110 includes depositing the optical material(s) and planarizing the transducer, for example using a chemical mechanical planarization (CMP). In some such embodiments, a planarization stop layer may be employed to further control the CMP.

A write pole configured to write to a region of the media is provided, via step 112. Step 112 may include depositing a high saturation magnetization material. For example, such a material may be plated and/or sputtered. The bottom surface of the write pole is thermally coupled with the top of the heat sink. In some embodiments, a portion of the bottom surface of the write pole is in physical contact with the heat sink. One or more coils for energizing the write pole are provided, via step 114. Fabrication of the EAMR transducer may then be completed, via step 116. For example, poles, shields, and/or other structures may be formed or completed.

Figure 3:
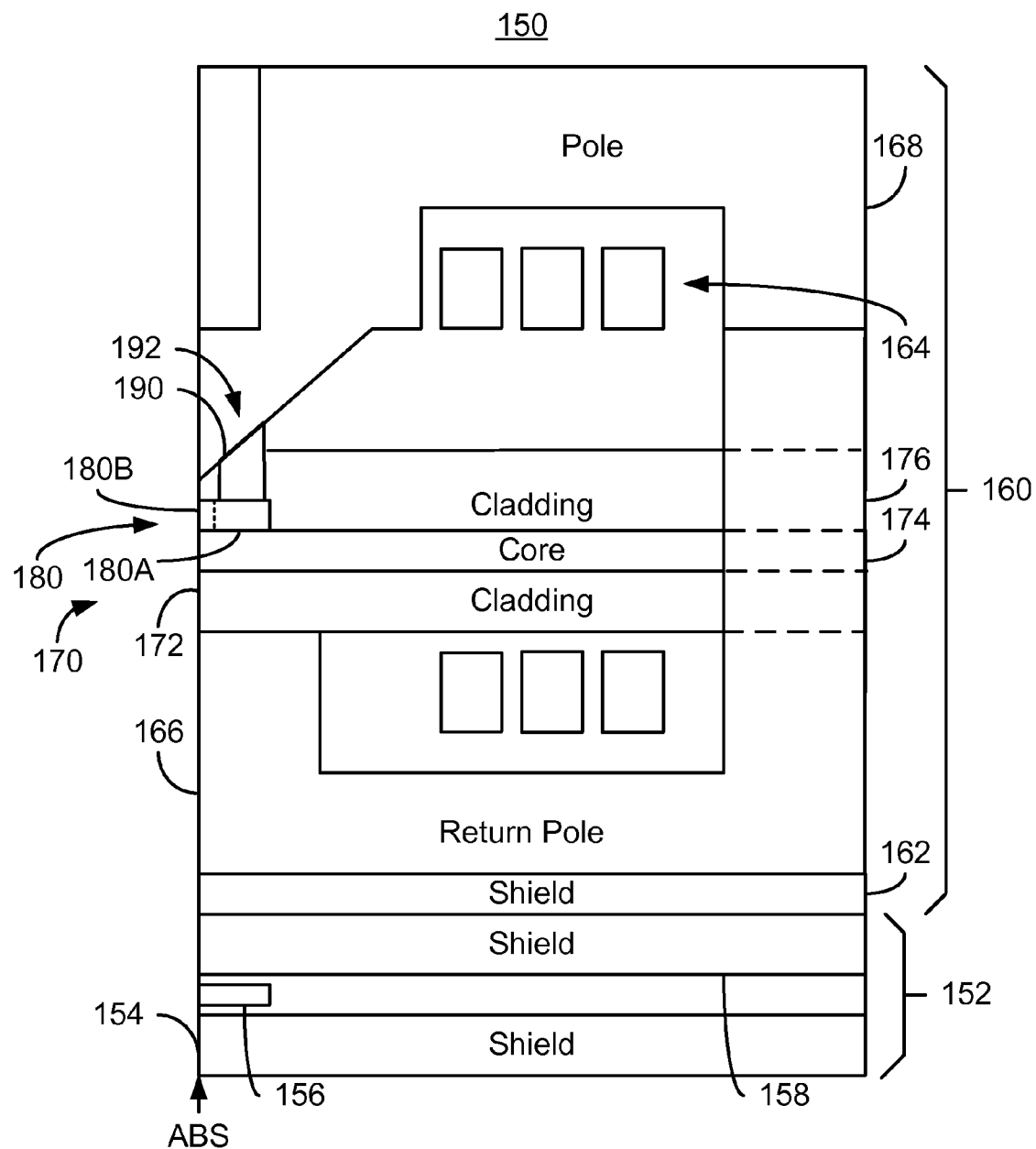
FIG. 3 is a diagram depicting an exemplary embodiment of an EAMR head.

Thus, an EAMR transducer including a heat sink thermally coupling the NFT and the pole may be provided. In some embodiments, the pole may have a sloped bottom surface. For example, FIG. 3 depicts one embodiment of an EAMR head 150 fabricated using the method 100. For clarity, FIG. 3 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 160 includes waveguide 170, NFT 180, write pole 168, return pole 166, coil(s) 164, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. Further, the waveguide 170 is shown as residing between the pole 168 and return pole 166. In another embodiment, the pole 168 may be between the waveguide and the return pole 166.

The waveguide 170 directs energy from the laser to the ABS and more specifically to the NFT 180. The waveguide 170 includes cladding 172 and 176 as well as core 174. The NFT 180 is optically coupled with the waveguide 170, receiving energy from the core 174. The NFT 180 is proximate to the ABS. For example, the NFT 180 is shown as having a surface occupying a portion of the ABS. The NFT 180 focuses energy from the waveguide 170 onto a region of the media (not shown). In some embodiments, the NFT 180 includes a disk 180A and a pin 180B. The pin 180B is between the disk 180A and the ABS. Thus, the disk 180A is recessed from the ABS and thus is shown by a dashed line in the ABS view of FIG. 3. The disk 180A extends further in the track width direction (perpendicular to the plane of the page in FIG. 3) than the pin 180B. Although termed a disk, the disk 180A of the NFT 180 need not be disk-shaped. For example, instead of having a circular cross-sectional shape, the disk 180A may be square, rectangular, or have another shape.

The write pole 168 is configured to write to the region of the media heated by the NFT 180. In the embodiment shown, a portion of the bottom surface of the pole 168 proximate to the ABS is not parallel to the top surface of the NFT 180. In some embodiments, this portion of the bottom surface of the pole 168 may be configured to be parallel to the top surface of the NFT. Another portion of the bottom surface of the pole 168 slopes away from the NFT 180.

The heat sink 190 is thermally coupled at its bottom with the NFT 180 and at its top with the bottom surface of the pole 168. The heat sink 190 has a top surface 192 that is sloped. In general, the width of the heat sink is smaller than that of the NFT 180.

Using various embodiments of the method 100, the heat sink 190 can be provided in the EAMR transducer 150. The heat sink 190 allows for heat to be carried away from the NFT 180. The method 100 also provides the heat sink 190 without damaging the NFT 180. Thus, the heat sink 190 is able to transport heat from the NFT 180. Consequently, performance and reliability of the NFT 180 may be improved. Because the heat sink 180 and thus the pole 190 may be sloped, a separation between the magnetic and optical components may be maintained. Thus, performance and reliability of the EAMR transducer 150 may be enhanced.

Figure 4:
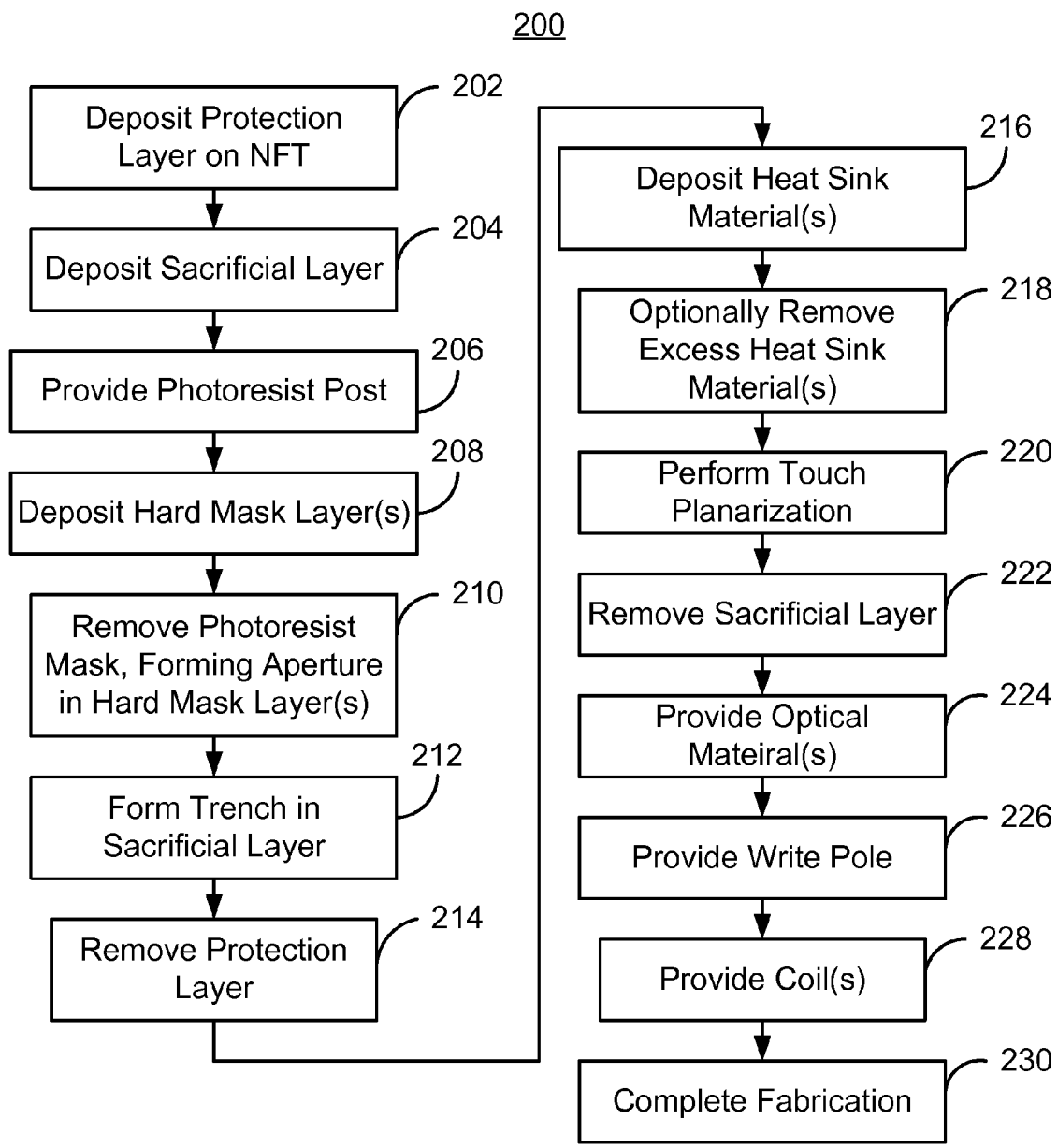
FIG. 4 is a flow chart depicting an exemplary embodiment of a method for providing a heat sink in an EAMR transducer.

FIG. 4 is a flow chart depicting another exemplary embodiment of a method 200 for fabricating an EAMR transducer. Thus, the method 200 is analogous to the method 100. For simplicity, some steps may be omitted, interleaved, and/or combined. FIGS. 5-13 are diagrams depicting ABS views of an exemplary embodiment of a portion of an EAMR transducer during 250 fabrication. For clarity, FIGS. 5-13 are not to scale. Further, although FIGS. 5-13 depict views from the ABS location (location at which the ABS is to be formed) and ABS at a particular point in the pole, other embodiments may have other locations for the ABS. Referring to FIGS. 4-13, the method 200 is described in the context of the EAMR transducer 250. However, the method 200 may be used to form another device (not shown). The EAMR transducer 250 being fabricated may be part of a merged head that also includes a read head (not shown in FIGS. 5-13), a laser (not shown in FIGS. 5-13) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. For example, an NFT has already been fabricated. The method 200 is also described in the context of providing a single EAMR transducer 250 and a single heat sink in the EAMR transducer 250. However, the method 200 may be used to fabricate multiple transducers and/or multiple heat sinks per transducer at substantially the same time. The method 200 and device 250 are also described in the context of particular layers. However, in some embodiments, such layers may include multiple sublayers.

Figure 5:
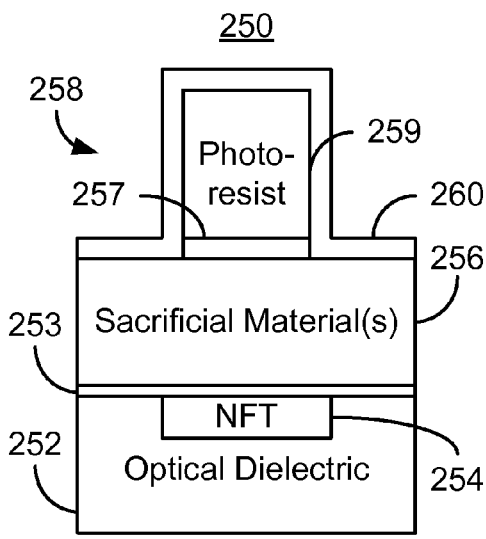
FIGS. 5-13 are diagrams depicting an exemplary embodiment of a magnetic recording transducer during fabrication.

A protection layer may be deposited on the NFT, via step 202. The protection layer is used to prevent damage to the NFT in subsequent processing steps. Step 202 may include depositing a thin layer of alumina, for example via atomic layer deposition (ALD). The protection layer may be on the order of one through two nanometers thick. A sacrificial layer is deposited on the protection layer, via step 204. The sacrificial layer may be a hard mask layer, such as a-C, SiC, and/or an organic material. The sacrificial layer is approximately the same thickness as the heat sink. In some embodiments, the sacrificial layer may be on the order of one hundred and fifty nanometers thick. A photoresist post mask is provided, via step 206. In some embodiments, the photoresist post includes multiple layers. A hard mask layer may then be deposited, via step 208. The hard mask may be a bilayer. For example, a Cr/Ru or Cr/Ta bilayer that is at least five and not more than ten nanometers thick may be deposited in step 208. FIG. 5 depicts the EAMR transducer 250 after step 208 has been performed. As can be seen in FIG. 5, the NFT 254 resides in the optical dielectric 252. A protection layer 253 has been formed on the NFT 254. Sacrificial material(s) 256 are on the protection layer 253. Mask 258 is also depicted. The mask 258 includes a BARC layer 257 and a photoresist post 259. Hard mask bilayer 260 is also shown. However, individual layers in the hard mask 260 are not separately shown.

Figure 6:
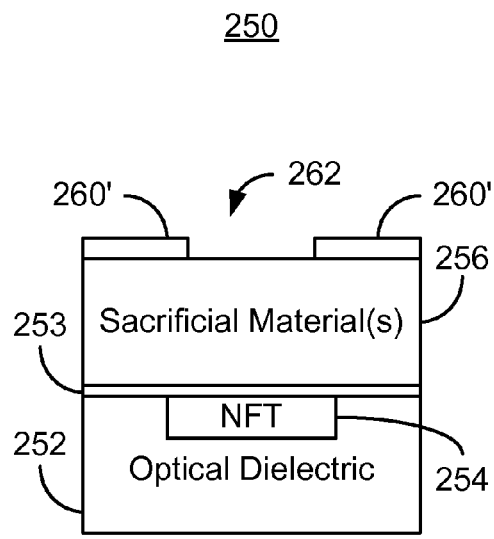

The photoresist mask is removed, via step 210. In some embodiments, step 210 includes performing a high angle ion mill to open a portion of the bilayer hard mask on the sides of the photoresist post 259. Such an ion mill may be performed at an angle not less than sixty five degrees from normal to the surface of the transducer 250. As a result, an aperture is formed in the bilayer hard mask 260. FIG. 6 depicts the EAMR transducer 250 after step 210 is performed. Thus, aperture 262 has been formed in bilayer hard mask 260'.

Figure 7:
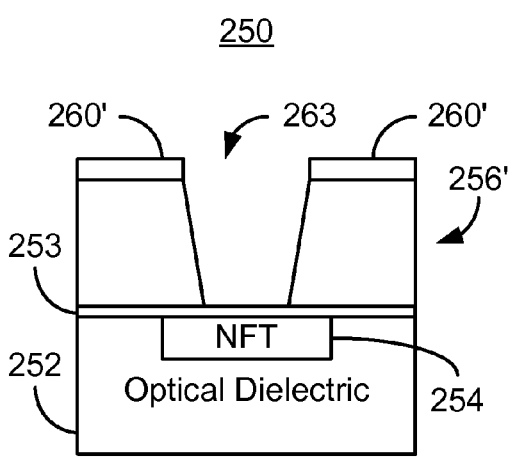

A portion of the sacrificial layer 256 exposed by the aperture is removed, via step 212. Thus, a trench may be formed in the sacrificial layer 256. An etch appropriate to the sacrificial material is used in step 212. For example, an oxygen plasma etch may be used. The protection layer 253 is resistant to the etch. For example, FIG. 7 depicts the EAMR transducer 250 after step 212 is performed. Thus, a trench 263 is formed in the sacrificial material(s) 256'. In the embodiment shown, the trench 263 has a top wider than the bottom. However, in other embodiments, the trench may have another profile. For example, in some embodiments, the trench walls may be substantially vertical. In other embodiments, the bottom of the trench may be wider than the top.

Figure 8:
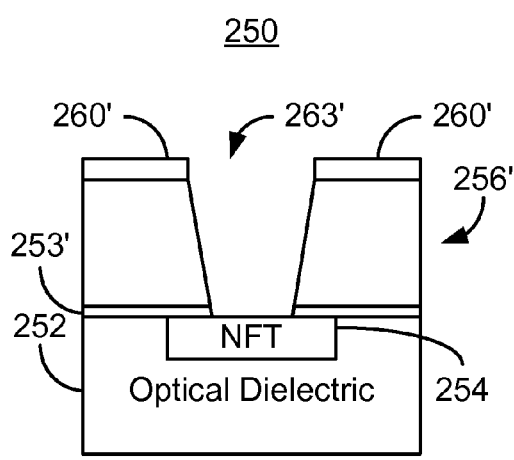

The protection layer 253 is removed, via step 214. In some embodiments, step 214 is performed using a wet etch. In other embodiments, another removal process, such as a dry etch, may be used. The NFT 254 is resistant to removal process used in step 214. For example, the wet etch used in step 214 may be an aluminum oxide wet etch. The NFT 254 is resistant to such an etch. FIG. 8 depicts the transducer 250 after step 214 is performed. Thus, the bottom of the trench 263' is at the NFT 254.

Figure 9:
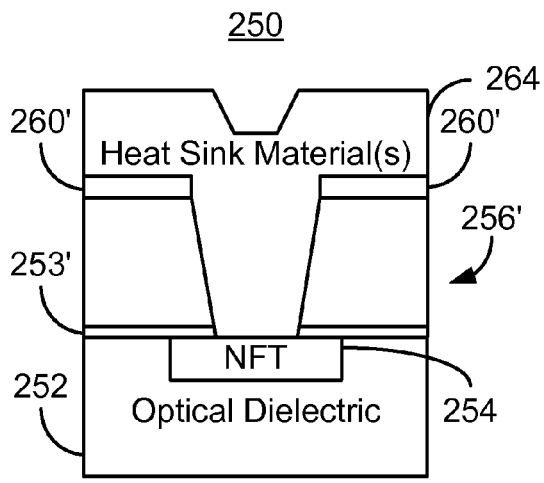

Heat sink material(s) are deposited, via step 216. In some embodiments, step 216 includes depositing Au and/or Cu. FIG. 9 depicts the EAMR transducer 250 after step 216 is performed. Thus, heat sink material(s) 264 are shown. A portion of the heat sink material(s) are in the trench, and another portion are outside of the trench.

Figure 10:
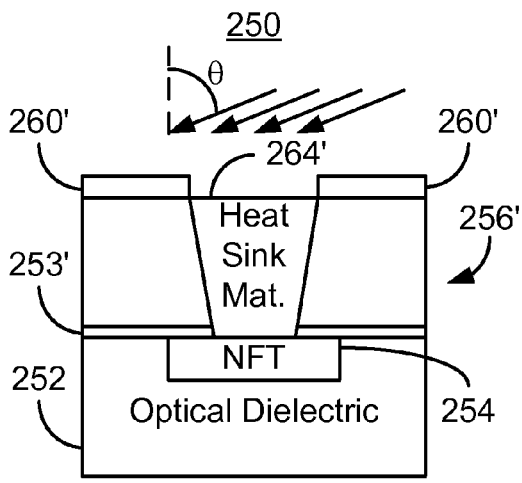
Figure 11:
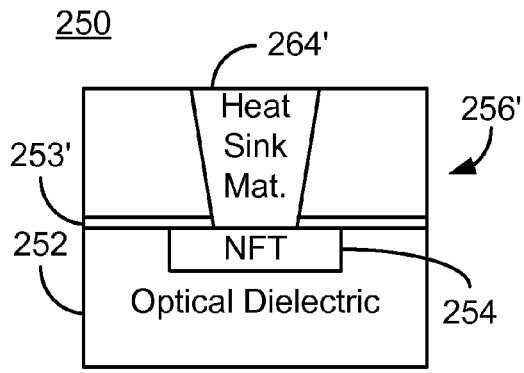

At least part the heat sink material(s) outside of the trench are removed, via step 218. In some embodiments, step 216 is performed using a high angle ion mill. FIG. 10 depicts the transducer 250 as step 216 is performed. Thus, a high angle ion mill, depicted by arrows at angle θ is shown. In some embodiments, the angle, θ is not less than sixty-five degrees. In addition to the high angle ion mill, a touch planarization may be used, via step 220. In a touch planarization, a lower down force and/or more dilute slurry may be used for a short time. FIG. 11 depicts the EAMR transducer 250 after step 220 is performed. Thus, heat sink 264' remains, but the hard mask 260' has been removed. The heat sink 264' is thermally coupled with the NFT 254.

Figure 12:
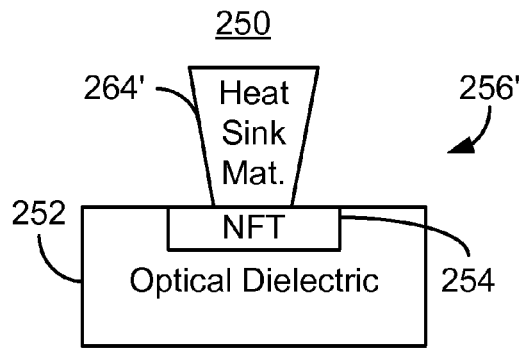

The sacrificial material 256' is removed, via step 222. In some embodiments, an etch appropriate to the sacrificial material 264 is used. For example, an oxygen plasma etch may be used. FIG. 12 depicts the EAMR transducer 250 after step 222 is performed. Thus, the heat sink 264' stands alone.

Figure 13:
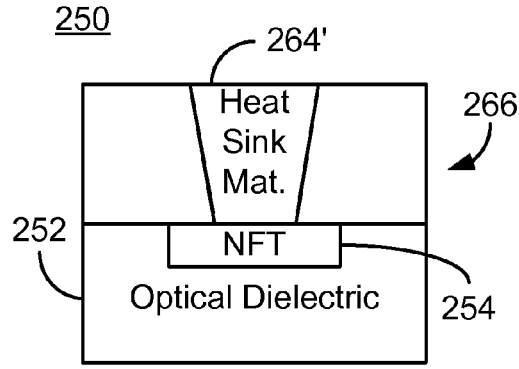

Optical material(s) are provided around the heat sink 264', via step 224. Step 224 may include depositing optical material(s) such as aluminum oxide, and planarizing the EAMR transducer 250. FIG. 13 depicts the EAMR transducer 250 after step 224 is performed. Thus, optical material(s) 266 are shown.

A write pole configured to write to a region of the media is provided in step 226 and coil(s) provided in step 228. A portion of the bottom surface of the write pole is thermally coupled with the top surface of the heat sink 264'. The coil(s) are used in energizing the write pole. Fabrication may then be completed, via step 230. For example, step 230 may be used to remove a portion of the heat sink 264. Thus, a sloped top surface may be formed for the heat sink. In another embodiment, some of the remaining structures, such as return pole(s), shields, and other structures.

Thus, using the method 200, the EAMR transducer 250 may be fabricated. The EAMR transducer has the desired geometry and heat dissipation. The method 200 and EAMR transducer 250 share the benefits of the method 100 and the EAMR transducer 150. Consequently, manufacturing, reliability, and performance of the transducer 250 has been improved.

Figure 14:
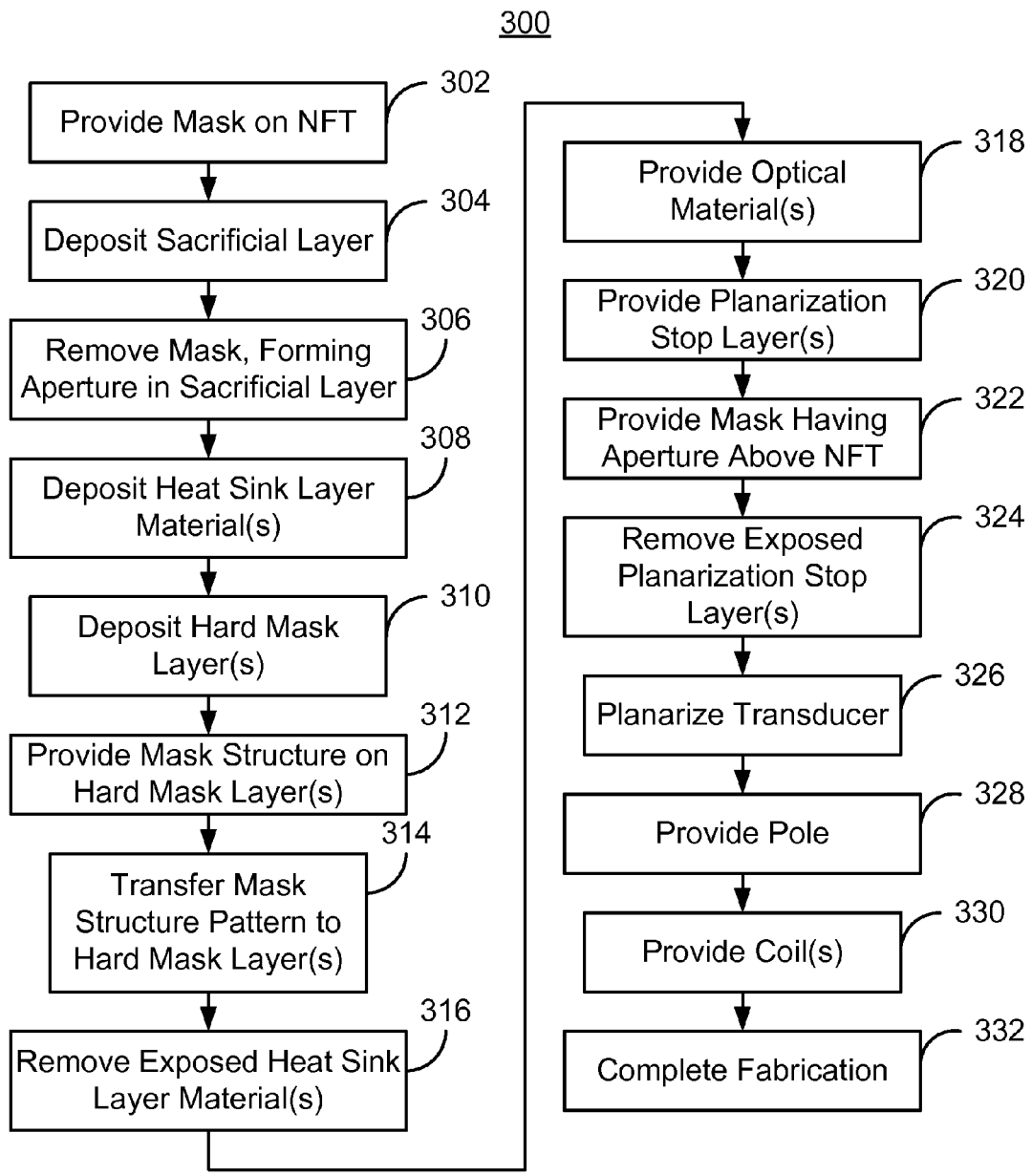
FIG. 14 is a flow chart depicting another exemplary embodiment of a method for providing a heat sink in an EAMR transducer.

FIG. 14 is a flow chart depicting another exemplary embodiment of a method 300 for fabricating an EAMR transducer. Thus, the method 300 is analogous to the method 100. For simplicity, some steps may be omitted, interleaved, and/or combined. FIGS. 15-24 are diagrams depicting ABS views of an exemplary embodiment of a portion of an EAMR transducer during 250 fabrication. For clarity, FIGS. 15-24 are not to scale. Further, although FIGS. 15-24 depict views from the ABS location (location at which the ABS is to be formed) and ABS at a particular point in the pole, other embodiments may have other locations for the ABS. Referring to FIGS. 14-24, the method 300 is described in the context of the EAMR transducer 350. However, the method 300 may be used to form another device (not shown). The EAMR transducer 350 being fabricated may be part of a merged head that also includes a read head (not shown in FIGS. 15-24), a laser (not shown in FIGS. 15-24) and resides on a slider (not shown) in a disk drive. In addition, other portions of the EAMR transducer 350, such as the pole(s), shield(s), coil(s), and remaining optics are not shown. The method 300 also may commence after formation of other portions of the EAMR transducer 350. For example, an NFT has already been fabricated. The method 300 is also described in the context of providing a single EAMR transducer 350 and a single heat sink in the EAMR transducer 350. However, the method 300 may be used to fabricate multiple transducers and/or multiple heat sinks per transducer at substantially the same time. The method 300 and device 350 are also described in the context of particular layers. However, in some embodiments, such layers may include multiple sublayers.

Figure 15:
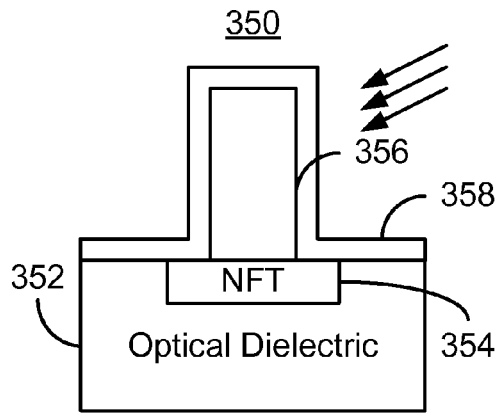
FIGS. 15-24 are diagrams depicting an exemplary embodiment of a magnetic recording transducer during fabrication.

A mask is provided on the NFT, via step 302. The mask may include a photoresist post. In some embodiments, the photoresist post includes multiple layers, such as an underlying BARC layer and a photoresist layer on the BARC layer. The photoresist post may also be thin. For example, the diameter of the mask provided in step 302 may be as low as fifty nanometers. In other embodiments, the mask may have a different diameter. A thin sacrificial layer may then be deposited, via step 304. In some embodiments, the thin sacrificial layer is at least five and not more than ten nanometers in thickness. The sacrificial layer may include optical material(s), such as aluminum oxide. In such embodiments, the layer is termed sacrificial because it is used to form an aperture, described below. However, the layer may also function as part of the EAMR transducer 350. FIG. 15 depicts the EAMR transducer 350 after step 304 is performed. Thus, optical dielectric 352 and NFT are shown. Also shown are mask 356 and sacrificial layer 358.

Figure 16:
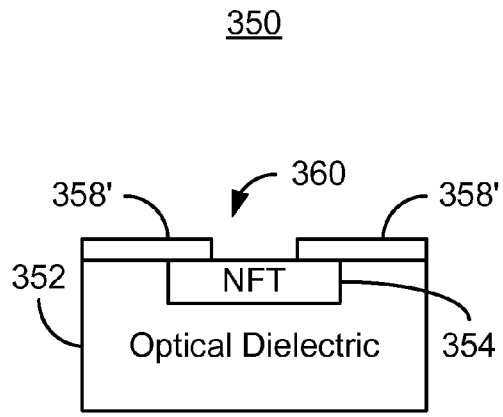

The mask 356 is removed, via step 306. The mask removal may include performing a high angle ion mill to remove the portion of the sacrificial layer 358 on the sides of the mask 356 and performing a lift-off process. The high angle ion mill is depicted by arrows in FIG. 15. However, in another embodiment, the mask 356 may be removed in another manner. FIG. 16 depicts the EAMR transducer 350 after step 306 is performed. Thus, aperture 360 has been formed in the remaining sacrificial layer 358'.

Figure 17:
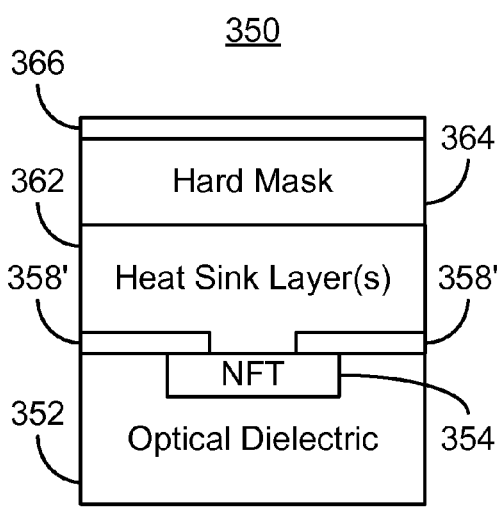

A layer of heat sink material(s) is deposited, via step 308. Step 308 may include plating or otherwise depositing high thermal conductivity materials(s) such as Cu and/or Au. Hard mask material(s) are provided, via step 310. In some embodiments, step 310 includes depositing a layer including SiC and/or a-C, for example to a thickness of 50 nm for a-C and 100 nm for SiC. The hard mask provided in step 310 may also include a capping layer. In some embodiments, up to fifty nanometers of tantalum oxide may be provided as a capping layer. FIG. 17 depicts the transducer 350 after step 310 has been performed. Thus, heat sink layer(s) 362, hard mask layer(s) 364, and capping layer 366 are depicted.

Figure 18:
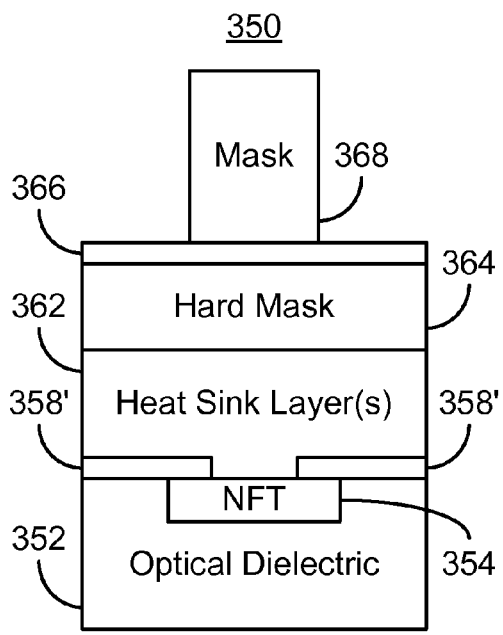

A mask is provided on the hard mask 364, via step 312. The mask may include a photoresist post. In some embodiments, the photoresist post includes multiple layers, such as an underlying BARC layer and a photoresist layer on the BARC layer. The diameter of the mask provided in step 312 may match the desired diameter of the heat sink. FIG. 18 depicts the EAMR transducer after step 312 is performed. Thus, the mask 368 is shown.

Figure 19:
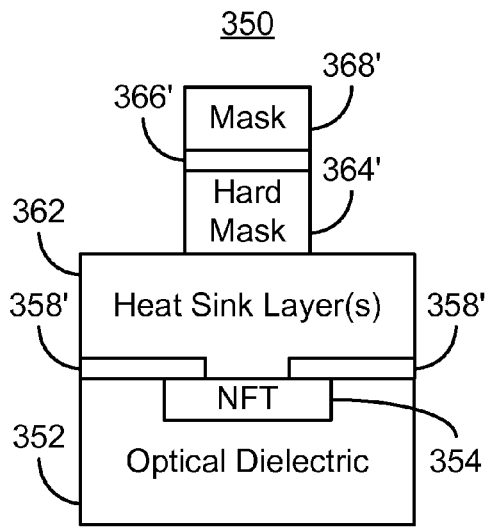

The pattern of the mask 368 is transferred to the underlying hard mask layers, via step 314. Step 314 may be performed using an etch appropriate to the hard mask layer(s) 364 and 366. FIG. 19 depicts the transducer 350 after step 314 is performed. Thus, the hard mask 364' and capping layer 366' each has a cross-section that matches the mask 368'.

Figure 20:
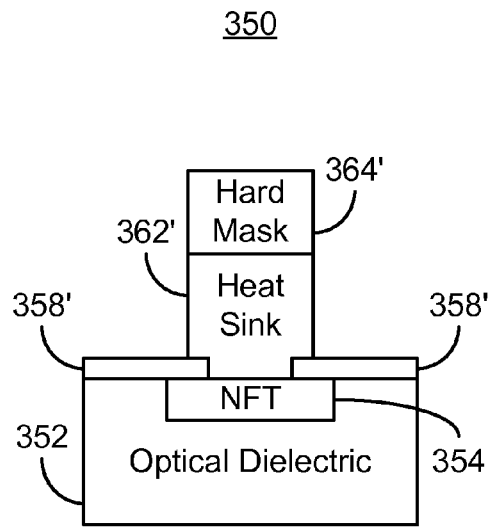

The pattern of the hard mask (layers 364 and 366) is transferred to the heat sink layers 362, via step 316. Step 316 is performed by removing the exposed portion(s) of the heat sink material(s) 362. FIG. 20 depicts the transducer 350 after step 316 is performed. Thus, heat sink 362' has been formed. The heat sink 362' is thermally coupled with the NFT 354.

Figure 21:
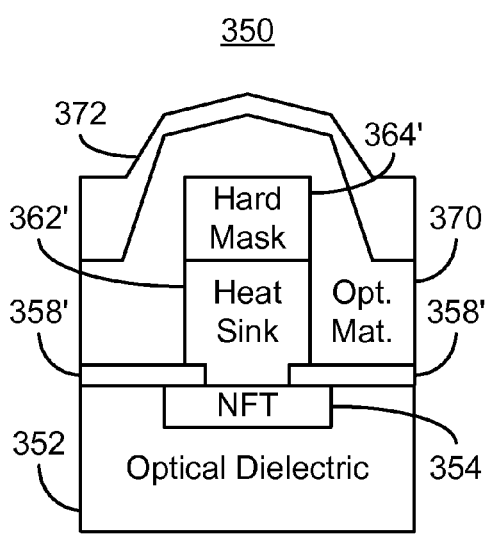

Optical material(s) are provided, via step 318. For example, the transducer 350 may be backfilled with aluminum oxide. A planarization stop layer is also provided, via step 320. Step 320 may include depositing the planarization stop layer to a desired thickness. In some embodiments, the desired thickness is the same as the hard mask layer 364'. FIG. 21 depicts the EAMR transducer after step 320. Thus, optical material(s) 370 and planarization stop layer 372 are shown.

Figure 22:
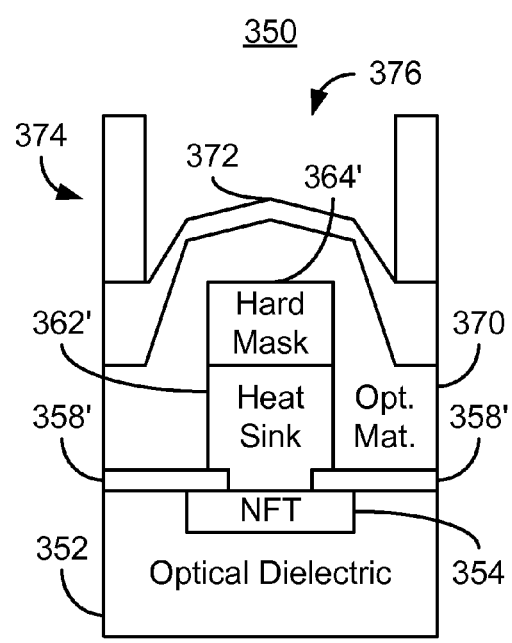

A photoresist mask having an aperture above the heat sink 262' is provided, via step 322. In some embodiments, step 322 provides a photoresist mask using photolithography. FIG. 22 depicts the transducer 350 after step 322 is performed. Thus, mask 374 with aperture 376 is shown.

Figure 23:
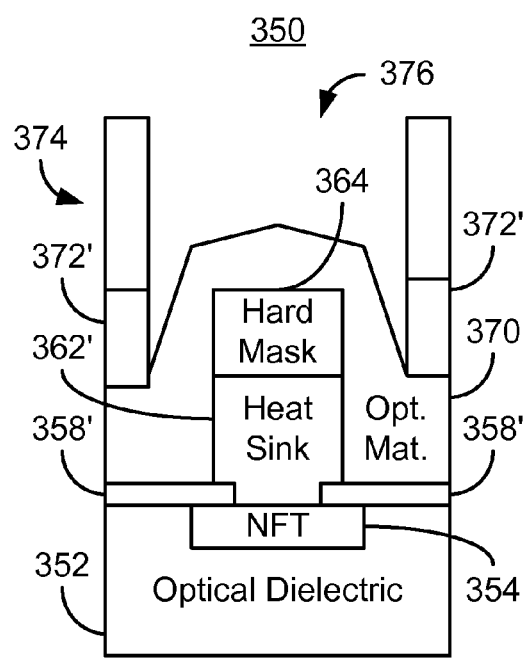
Figure 24:
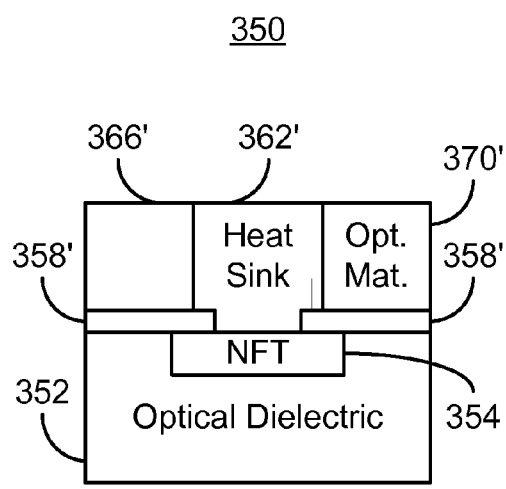

The exposed portion of the planarization stop layer 372 is removed, via step 324. FIG. 23 depicts the transducer after step 324 is performed. Thus, the portion of the planarization stop layer exposed by the aperture 376 has been removed. Consequently, stop layer 372' remains. The mask 374 may then be stripped. The transducer is then planarized, via step 326. FIG. 24 depicts the transducer 250 after step 326 is performed. Thus, heat sink 362' has thus been formed.

A write pole configured to write to a region of the media is provided in step 328 and coil(s) provided in step 230. A portion of the bottom surface of the write pole is thermally coupled with the top surface of the heat sink 262'. The coil(s) are used in energizing the write pole. Fabrication may then be completed, via step 332. For example, step 332 may be used to remove a portion of the heat sink 362'. Thus, a sloped top surface may be formed for the heat sink. In another embodiment, some of the remaining structures, such as return pole(s), shields, and other structures.

Thus, using the method 300, the EAMR transducer 350 may be fabricated. The EAMR transducer has the desired geometry and heat dissipation. The method 300 and EAMR transducer 350 share the benefits of the method 100 and the EAMR transducer 150. Consequently, manufacturing, reliability, and performance of the transducer 350 may be improved.

Figure 25:
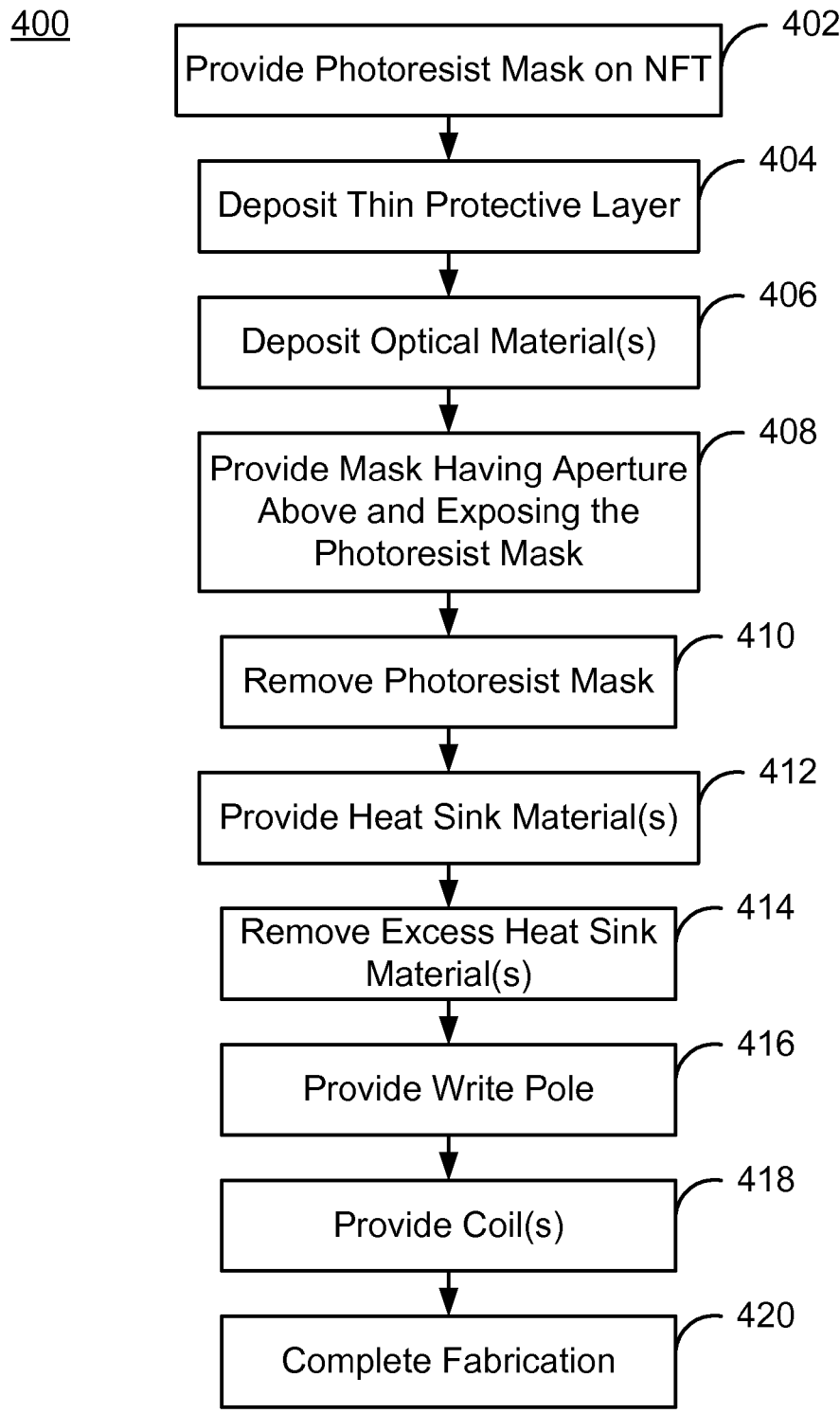
FIG. 25 is a flow chart depicting another exemplary embodiment of a method for providing a heat sink in an EAMR transducer.

FIG. 25 is a flow chart depicting another exemplary embodiment of a method 400 for fabricating an EAMR transducer. Thus, the method 400 is analogous to the method 100. For simplicity, some steps may be omitted, interleaved, and/or combined. FIGS. 26-35 are diagrams depicting ABS views of an exemplary embodiment of a portion of an EAMR transducer during 350 fabrication. For clarity, FIGS. 26-35 are not to scale. Further, although FIGS. 26-35 depict views from the ABS location (location at which the ABS is to be formed) and ABS at a particular point in the pole, other embodiments may have other locations for the ABS. Referring to FIGS. 25-35, the method 400 is described in the context of the EAMR transducer 450. However, the method 400 may be used to form another device (not shown). The EAMR transducer 450 being fabricated may be part of a merged head that also includes a read head (not shown in FIGS. 26-35), a laser (not shown in FIGS. 26-35) and resides on a slider (not shown) in a disk drive. In addition, other portions of the EAMR transducer 450, such as the pole(s), shield(s), coil(s), and remaining optics are not shown. The method 400 also may commence after formation of other portions of the EAMR transducer 350. For example, an NFT has already been fabricated. The method 400 is also described in the context of providing a single EAMR transducer 450 and a single heat sink in the EAMR transducer 450. However, the method 400 may be used to fabricate multiple transducers and/or multiple heat sinks per transducer at substantially the same time. The method 400 and device 450 are also described in the context of particular layers. However, in some embodiments, such layers may include multiple sublayers.

Figure 26:
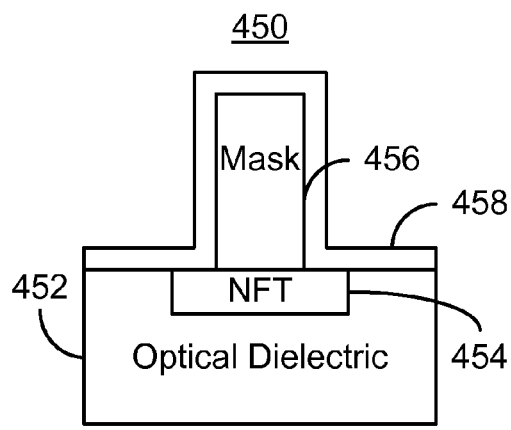

A mask is provided on the NFT, via step 402. The mask may include a photoresist post. In some embodiments, the photoresist post includes multiple layers, such as an underlying BARC layer and a photoresist layer on the BARC layer. For example, the diameter of the mask provided in step 402 may be as low as fifty nanometers. In other embodiments, the mask may have a different diameter. A thin protective layer may then be deposited, via step 404. In some embodiments, the thin protective layer is at least five and not more than ten nanometers in thickness. The protective layer may include optical material(s), such as aluminum oxide. FIG. 26 depicts the EAMR transducer 450 after step 404 is performed. Thus, optical dielectric 452 and NFT 454 are shown. Also shown are mask 456 and protective layer 458.

Figure 27:
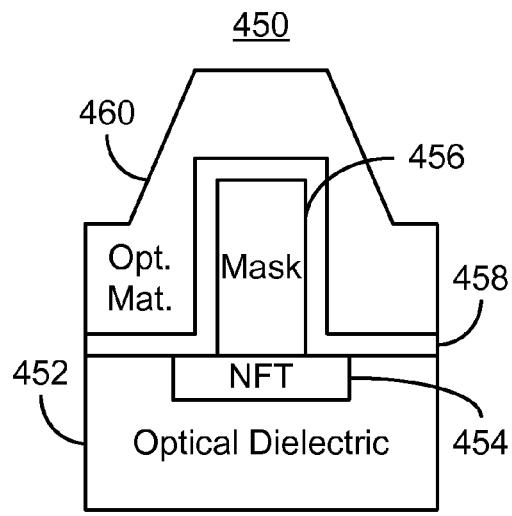

Optical material(s) are provided, via step 406. For example, the transducer 450 may be backfilled with aluminum oxide. The backfill is to the desired height of the heat sink. FIG. 27 depicts the transducer 450 after step 406 is performed. Thus, optical material(s) 460 are shown.

Figure 28:
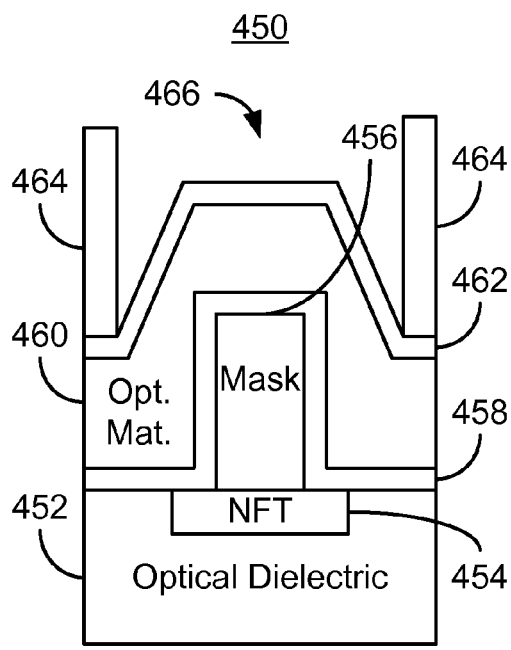
Figure 29:
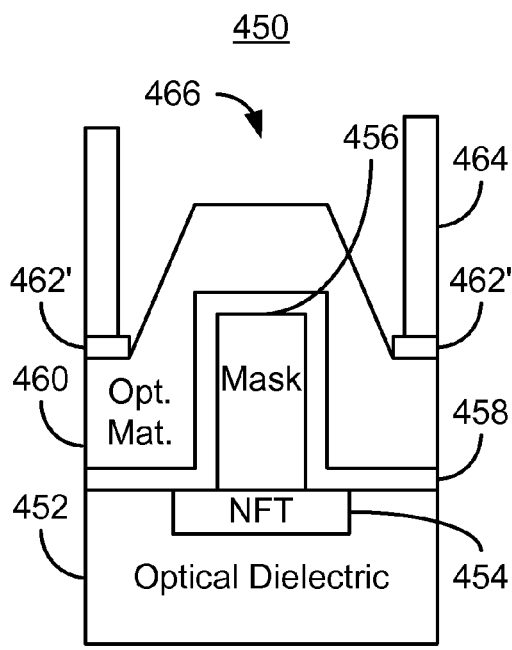
Figure 30:
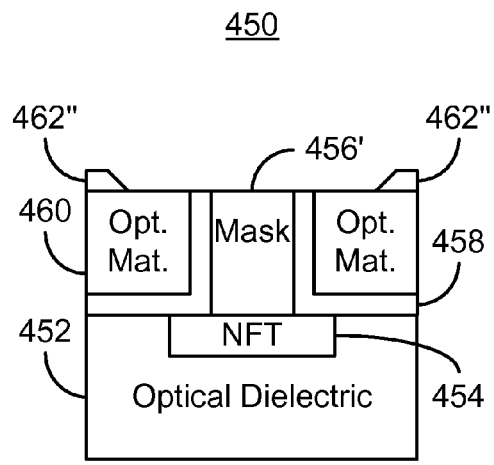

A thin hard mask is also provided, via step 408. The hard mask has an aperture above the mask 456 and exposes the photoresist mask. Step 408 may include depositing a thin hard mask layer, for example including SiC or a-C. In some embodiments, the thin hard mask layer may be not more than ten nanometers thick. To provide an aperture in the hard mask layer, photolithography may be used. For example, a photoresist mask having an aperture above the mask 456 may be formed. FIG. 28 depicts such an embodiment. Thus, hard mask layer 462 and photoresist mask 464 are shown. The exposed portion of the hard mask layer 462 may then be removed. For example, an oxygen or other appropriate plasma etch may be used. FIG. 29 depicts the transducer after such a removal has been completed. Thus, the portion of the hard mask layer 462 exposed by the aperture 466 has been removed. Consequently, hard mask layer 462' remains. The mask 464 may then be stripped and the transducer planarized. FIG. 30 depicts the transducer 450 after the planarization, such as a CMP. Thus, hard mask 462" has thus been formed. The hard mask 462" exposes the mask 456' at the desired height corresponding to the optical material(s) 460.

Figure 31:
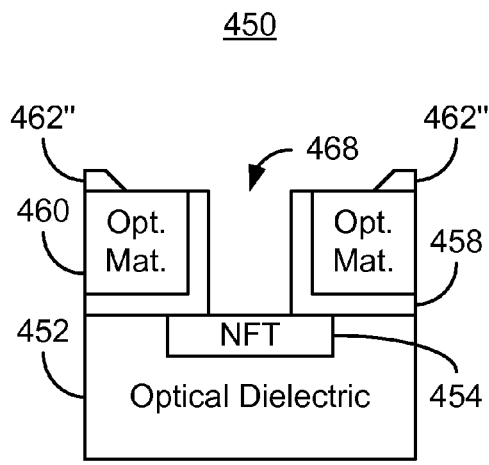
Figure 32:
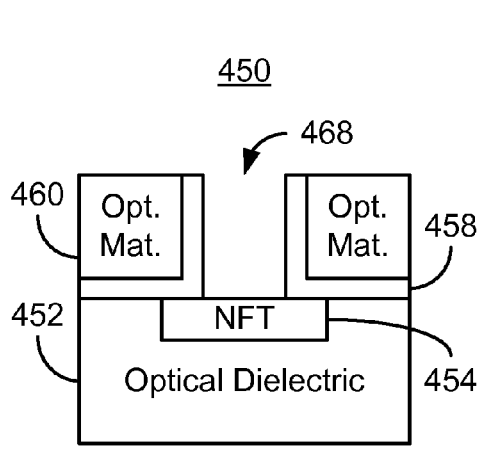

The mask 456' is removed, via step 410. FIG. 31 depicts the EAMR transducer 450 after step 412 is performed. Thus, trench 468 has been formed in the optical material(s) 460. In addition, the hard mask 462" may be removed, for example using an oxygen plasma. FIG. 32 depicts the EAMR transducer 350 after removal of the hard mask 462". However, in embodiments in which the hard mask 462" is not easily removable, the hard mask 462" may be removed later, for example using a planarization.

Figure 33:
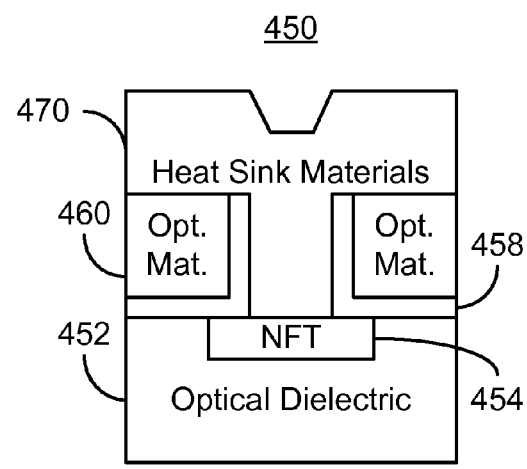

A layer of heat sink material(s) is deposited, via step 412. Step 412 may include plating or otherwise depositing high thermal conductivity materials(s) such as Cu and/or Au. FIG. 33 depicts the transducer 450 after step 412 is performed. Thus, heat sink material(s) 470 are shown.

Any excess heat sink material(s) 420 that are external to the trench may be removed, via step 414. The excess heat sink material(s) may be removed by ion milling the heat sink material(s) at a milling angle that is greater than zero degrees from a normal to a top surface of the transducer. In other embodiments, the excess heat sink material(s) 470 may be removed by a planarization such as a CMP. In still other embodiments, a combination of ion milling and planarization may be used. Thus, at least a portion of the heat sink is in the trench. FIG. 34 depicts the transducer 450 during step 414. Thus, arrows corresponding to the ion mill are shown. FIG. 35 depicts the transducer 450 after step 414 is performed. Thus, heat sink 470' that is thermally coupled to the NFT 454 has been formed.

A write pole configured to write to a region of the media is provided in step 416 and coil(s) provided in step 418. A portion of the bottom surface of the write pole is thermally coupled with the top surface of the heat sink 270'. The coil(s) are used in energizing the write pole. Fabrication may then be completed, via step 420. For example, step 420 may be used to remove a portion of the heat sink 264. Thus, a sloped top surface may be formed for the heat sink. In another embodiment, some of the remaining structures, such as return pole(s), shields, and other structures.

Thus, using the method 400, the EAMR transducer 450 may be fabricated. The EAMR transducer has the desired geometry and heat dissipation. The method 500 and EAMR transducer 450 share the benefits of the method 100 and the EAMR transducer 150. Consequently, manufacturing, reliability, and performance of the transducer 450 may be improved.

We claim:

1. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the method comprising:

depositing a sacrificial layer on the NFT;
providing a mask on the sacrificial layer, the mask having an aperture therein;
removing a portion of the sacrificial layer exposed by the aperture to form a trench therein, the trench being above the NFT;

providing a heat sink, at least a portion of the heat sink residing in the trench, the heat sink having a top surface and a bottom thermally coupled to the NFT;

providing at least one optical material around the heat sink;

providing a write pole configured to write to a region of the media, the write pole having a bottom surface, a portion of the bottom surface of the write pole being thermally coupled with the top surface of the heat sink; and providing at least one coil for energizing the write pole.

2. The method of claim 1 further comprising:

removing the sacrificial material after the step of providing the heat sink.

3. The method of claim 2 wherein the step of providing the mask on the sacrificial layer further includes:

providing a mask structure corresponding to the aperture on the sacrificial layer;

depositing a mask layer, the mask layer covering the mask structure;

removing the mask structure and a portion of the mask layer, forming the mask having the aperture therein.

4. The method of claim 3 wherein the mask structure includes a photoresist post.

5. The method of claim 4 wherein the mask layer includes at least one metal.

6. The method of claim 5 wherein the mask layer is a bilayer including a layer of Cr and a layer including a material selected from Ru and Ta.

7. The method of claim 2 wherein the sacrificial layer includes at least one of amorphous carbon, SiC and an organic material.

8. The method of claim 2 wherein the step of providing the heat sink further includes:

depositing at least one heat sink material; and ion milling the at least one heat sink material at a milling angle that is greater than zero degrees from a normal to a top surface of the transducer.

9. The method of claim 2 wherein the step of providing the heat sink further includes:

depositing at least one heat sink material; and planarizing the transducer.

10. The method of claim 2 further comprising:

depositing a protection layer on the NFT, the protection layer being resistant to a first removal process used in the step of removing the portion of the sacrificial layer; and removing the protection layer using a second removal process after the step of removing the portion of the sacrificial layer, the NFT being resistant to the second removal process.

11. The method of claim 10 wherein the first removal process includes an oxygen plasma etch and the second removal process includes an alumina wet etch.

12. The method of claim 2 wherein the heat sink includes at least one Au and Cu.

13. The method of claim 2 wherein the at least one optical material includes aluminum oxide.

14. The method of claim 2 wherein the trench has substantially vertical sidewalls.

15. The method of claim 2 wherein the trench has a bottom and a top wider than the bottom.

16. The method of claim 1 further comprising:

removing a portion of at least the heat sink to provide the top surface at an angle with respect to the ABS, the angle being greater than zero and less than ninety degrees.

17. The method of claim 1 wherein the sacrificial layer includes at least one optical layer and wherein the step of providing the heat sink further includes:

depositing a heat sink layer;

providing a hard mask layer on the heat sink layer;

providing a mask structure having a pattern on the hard mask layer, the pattern covering a portion of the hard mask layer above the trench;

transferring the pattern of the mask structure to the hard mask layer, forming a hard mask having the pattern; and transferring the pattern of the hard mask to the heat sink layer.

18. The method of claim 17 wherein the step of providing the at least one optical material further includes:

depositing the at least one optical material, the at least one optical material covering a remaining portion of the heat sink layer and the hard mask;

depositing a planarization stop layer on the at least one optical material;

providing an additional mask having an additional aperture therein, the additional aperture exposing the portion of the planarization stop layer above the NFT;

removing the portion of the planarization stop layer above the NFT;

removing the additional mask; and performing a planarization.

19. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the method comprising:

depositing a protection layer on the NFT;

depositing a sacrificial layer on the NFT, the sacrificial layer including at least one of amorphous carbon, SiC, and an organic material;

providing a photoresist post on the sacrificial layer, the photoresist post covering a portion of the sacrificial layer aligned with the NFT;

depositing a bilayer mask, the bilayer mask covering the photoresist post and including a Cr layer and at least one of a Ru layer and a Ta layer;

removing the photoresist post and a portion of the bilayer mask, thereby forming an aperture in the bilayer mask, the aperture exposing the portion of the sacrificial layer;

removing a portion of the sacrificial layer exposed by the aperture using an etch to form a trench therein, the trench being above the NFT, the protection layer being resistant to the etch;

removing the protection layer using a wet etch, the NFT being resistant to the wet etch;

depositing at least one heat sink material, a portion of the at least one heat sink material residing in the trench;

removing a portion of the at least one heat sink material outside of the trench, a remaining portion of the at least one heat sink material residing in the trench and having a bottom thermally coupled with the NFT;

removing the sacrificial material; and providing at least one optical material around the heat sink;

providing a write pole configured to write to a region of the media, the write pole having a bottom surface, a portion of the bottom surface of the write pole being thermally coupled with the top surface of the heat sink; and providing at least one coil for energizing the write pole.

20. The method of claim 19 further comprising:

removing a portion of at least the heat sink to provide the top surface at an angle with respect to the ABS, the angle being greater than zero and less than ninety degrees.

* * * * *